United States Patent

[11] 3,615,666

[72] Inventors Stephen L. Schlichter
 Green Township, Hamilton County;
 Frederick M. Joffe, Wyoming, both of Ohio
[21] Appl. No. 873,102
[22] Filed Oct. 31, 1969
[45] Patented Oct. 26, 1971
[73] Assignee The Procter & Gamble Company
 Cincinnati, Ohio

[54] HEAT TREATMENT OF STEAM DISTILLATE
 6 Claims, No Drawings
[52] U.S. Cl. ................................................. 99/65, 99/71
[51] Int. Cl. .................................................. A23f 1/04
[50] Field of Search ................................ 99/65, 71, 152

[56] References Cited
UNITED STATES PATENTS

| | | | |
|---|---|---|---|
| 2,853,387 | 9/1958 | Nutting ........................ | 99/71 |
| 3,148,070 | 9/1964 | Mishkin et al. ............... | 99/71 |
| 3,244,530 | 4/1966 | Byer et al. .................... | 99/71 |

FOREIGN PATENTS

| | | | |
|---|---|---|---|
| 1,044,234 | 9/1966 | Great Britain ............... | 99/71 |

Primary Examiner—Frank W. Lutter
Assistant Examiner—William L. Mentlik
Attorney—Edmund J. Sease

ABSTRACT: Disclosed is a controlled heat treatment of steam distillate obtained from steam distillation of roast and ground coffee. The heat-treated distillate is added back to an instant coffee processing stream to provide a unique flavored product.

HEAT TREATMENT OF STEAM DISTILLATE

BACKGROUND OF THE INVENTION

Typical instant coffee processing generally involves three basic steps: countercurrently extracting roast and ground coffee with aqueous extraction liquor, concentrating the resulting extract, preferably to at least a 50 percent solubles concentration, and finally, drying the extract to provide a dry instant coffee product. In line with the continuing effort towards an instant coffee product with exact flavor duplication of roast and ground coffee from time to time various process improvements have been made upon these three basic hereinbefore-described steps. While various methods have been employed in an effort to replace the coffee flavor values lost during the basic instant coffee processing steps, one such technique has enjoyed particular success and is widely used throughout the industry, i.e., steam distillation of volatiles from the roast and ground coffee prior to extraction.

In accord with this technique, roast and ground coffee contained in countercurrent extraction columns is prewetted and then steamed to separate and remove volatile aromatic flavors prior to extraction and concentration of the aqueous extract. The separated volatile and aromatic flavors are carried away with steam vapor and subsequently condensed to provide an aromatic flavor-laden steam distillate. Subsequently, the steam distillate is added back to the instant coffee processing stream, most commonly to a previously concentrated coffee extract, and the resulting concentrated extract containing aromatic flavor-laden steam distillate is dried to provide a flavor-laden instant coffee powder.

Adding distillate obtained from steam distillation of roast and ground coffee back into an instant coffee processing stream is well known in the art to provide an increase in the flavor of the resulting instant coffee. For example, see Mahlmann, U.S. Pat. No. 3,132,947, and Mahlmann U.S. Pat. No. 3,244,532, both of which relate to the steam distillation of volatiles from roast and ground coffee prior to extracting to provide an aqueous coffee extract. While the steam distillation procedures heretofore utilized in the art provide an improved flavor instant coffee product, there are certain disadvantages with the heretofore conventionally used processes. For instance, the amount of steam distillate that can be added back to an instant coffee processing stream has always been limited to within the range of from 0.01 percent to 1.0 percent by weight of the roast and ground coffee utilized in the extraction procedure, because of the amount of acid and acid-flavored materials contained in the steam distillate. In other words, the amount of steam distillate that could be added back to an instant coffee processing stream was limited by the amount of acidity that could be tolerated in the final instant coffee product. Accordingly, the level of distillate added back to the processing stream had to be carefully controlled, generally within the above range, so as not to exceed a consumer-acceptable acid tolerance level. Consequently, it would be desirable to provide a steam distillate which is capable of being added back to an instant coffee processing stream at higher levels without exceeding the consumer-acceptable acid tolerance level.

The terms "acid" and "acidity" as used herein when speaking with reference to steam distillates refer to the actual pH of the steam distillate and also to so-called acid flavored materials both of which play a role in determining the consumer-acceptable acid tolerance level of coffee beverages.

In addition to the above-mentioned excess acidity problem, steam distillate has in recent years been found to contain beneficial flavor values and also detrimental flavor values. Consequently, in recent years a few researchers have been devoting time to providing a method of separating beneficial and detrimental volatiles from steam distillate. For example, in the Mahlmann (-947) patent heretofore cited the beneficial and detrimental volatiles are separated by an internal refluxing through an elongated column containing coarsely ground coffee having large interstices between the individual coffee particles. In the process of that patent, steam is introduced into the column containing coarsely ground coffee and vaporization of volatiles occurs. The vapors rise through the interstices and condense on the roast and ground coffee particles. This internal refluxing involving rising vapors and falling condensate is repeated for a length of time, after which beneficial volatiles are bled off as vapors from the top of the column, and the detrimental highly acid volatiles are said to remain behind as condensate on coffee in the column. The Mahlmann (-532) patent discloses steaming an agitating bed of roast and ground coffee particles at a pressure of from 2 to 20 p.s.i.g., and at a temperature of from 180° to 230° F. The resulting steam distillate is collected and fractionated to remove undesirable acids and thereafter added back to the instant coffee processing stream.

While skilled workers in the art have heretofore appreciated that steam distillate is a mixture of both beneficial and detrimental volatiles, no one has developed a process whereby beneficial volatiles flavor can be enhanced and detrimental volatiles flavor can be minimized without involving a complicated and time consuming separation technique. Moreover, it is believed that the processes heretofore used in the art did not provide an enhancement of the flavor values of the beneficial portion of the steam distillate.

Accordingly, it is an object of this invention to provide a method of enhancing beneficial flavor values contained in a steam distillate, and minimizing or negating the effect of the detrimental flavor volatiles contained in a steam distillate by a process which does not involve a time consuming separation technique. It is an additional object of this invention to provide a specially treated steam distillate capable of being added back to an instant coffee processing stream at high levels without exceeding the consumer-acceptable acid tolerance level. These and other objects of the invention will become apparent from the following description.

SUMMARY OF THE INVENTION

This invention relates to a method of decreasing steam distillate acidity, flavor-enhancing beneficial flavor values contained in a steam distillate, and negating the effect of detrimental flavor values contained in a steam distillate without utilization of a separation technique. This is accomplished by a controlled heat treatment of coffee steam distillate under oxidizing conditions. Speaking most specifically, the process of this invention comprises an improvement in the process of making an instant coffee product wherein said process includes a steam distillation procedure and the resulting steam distillate is added back to an instant coffee processing stream, the improvement comprising heating said steam distillate at a temperature of from 80° F. to 140° F. for from 20 minutes to 6 hours in a closed vessel having an air headspace of from one-eighth to one-half of the volume of the vessel.

Typically, steam distillation of volatiles is the first step in an instant coffee processing operation. Roast and ground coffee is loaded into countercurrent extraction columns, the system is closed, and the ground roasted coffee is treated with steam which is passed through the extraction columns. In a particularly satisfactory operation, the steam is passed through the extraction columns at a temperature of 220° F. at a pressure of 5 p.s.i.g. The result of this process is a uniform addition of moisture to the ground coffee due to the condensation upon the coffee of water derived from the steam. This increase of the moisture content of the ground roasted coffee results in the development and liberation of volatile constituents. The steaming of the roasted coffee opens the cellular structure, thereby facilitating the rapid removal of volatile constituents and rapid draining in the course of subsequent extraction of the nonvolatile constituents of the roasted coffee. As the steam is passed through the coffee contained in the column, the volatile substances liberated are carried away with the steam. The steam containing volatile constituents derived from the coffee is passed through a water-jacketed condenser wherein it is condensed and cooled. Thereafter the steam distillate, now in liquid form, is passed through a chiller which is a second condenser held at a temperature of about 35° F. by an ice water-containing jacket. The condensed and subsequently chilled steam distillate is then collected in a vessel and reserved for the hereinafter-described heat treatment. In order to insure complete condensation of the steamed volatiles, the vapors passing out of the ice water-chilled condenser are often pumped into a vessel contained in a dry ice-acetone bath at −110° F. wherein residual amounts of volatiles are collected and subsequently placed in the hereinbefore-mentioned steam distillate-containing vessel.

No criticality exists with the type of vessel employed during the hereinafter-described heat treatment and any vessel capable of transferring heat and capable of being closed or sealed can be employed. Particularly satisfactory results are obtained when a stainless steel vessel, having a liquid inlet line and a liquid outlet line and corresponding valves to seal the vessel, is employed.

In a typical operation, following the removal of the volatile constituents from ground roasted coffee, a water extraction is then made of the water-soluble constituents of the coffee. This extraction is most commonly made in a countercurrent extraction train. The aqueous extract emitting from the countercurrent extraction train is thereafter concentrated by a method such as thin-film evaporation to a concentration of preferably of at least 50 percent solubles concentration. This minimizes the possibility of extreme flavor deterioration during drying. After the aqueous extract has reached a suitable degree of concentration by evaporation, it is mixed with steam distillate containing the volatile constituents initially separated from the coffee by means of the hereinbefore-described steam treatment. Thereafter, the concentrated extract, including both the aqueous extract and the volatile constituents, is most commonly spray-dried. This process produces a dry instant coffee product containing not only the aqueous extractives but also the volatile constituents of the roasted coffee with their added flavor elements.

A detailed discussion of extract concentration and drying, as briefly mentioned above, can be found in several literature references and will not be given herein. Briefly in regard to extract concentration, Sivetz, *Coffee Processing Technology*, (1963) (Vol. 2) pages 19–20 and 48–50, which are incorporated herein by reference discloses details of extract concentration. Generally extract is concentrated, i.e. water removed, until the coffee solubles content is from 45 percent to 70 percent by weight and can be accomplished by vacuum evaporation, freeze concentration, flashing, and thin film evaporation. In regard to drying a concentrated extract, Sivetz, *Coffee Processing Technology*, 1963 ed., Vol. 1 Chapter 11 and 12 which are incorporated herein by reference disclose drying can be accomplished by spray drying, drum drying and freeze drying.

Turning now to the specific steam distillate heat treatment process, it has been surprisingly discovered that a controlled heat treatment of the steam distillate obtained from steam distillation of roast and ground coffee as hereinbefore described enhances the desirable volatile flavors, and minimizes or negates the undesirable volatile flavors; and, as an additional benefit, a substantial decrease in the acidity of the steam distillate is effected. The final result of the carefully controlled heat treatment of steam distillate, as hereinafter-described, is an instant coffee product which has a unique flavor and which can have high concentrations of steam distillate present without a substantial and undesirable increase in the acidity level of the instant coffee. This factor is even more surprising when considering that the prior art teaches away from heat treatment of a steam distillate. For instance, in U.S. Pat. No. 3,148,070, it is taught that aromatic compounds rapidly decompose when held too long at elevated temperatures, and therefore it is essential that the residence time of the steam distillate in the apparatus employed in that patent be as short as possible.

As used herein, the phrase "high concentrations of steam distillate" refers to concentrations generally above 1 percent by weight of the roast and ground coffee used in the extraction procedure.

In accord with the process of this invention, steam distillate obtained as hereinbefore-described is placed in a closed vessel having a substantial air headspace. In order to effect the controlled heat treatment process of this invention, it is important that the vessel have an air headspace. If no air headspace exists, the controlled heat treatment of this invention will have no beneficial effect upon the steam distillate. It is believed this is so because without an air headspace controlled oxidation of the steam distillate will not occur. Vessel air headspace, as the term is used herein, refers to the fractional portion of the volume of a vessel which is air containing as compared to the volume of the vessel containing steam distillate. For example, an air headspace of one-eighth of the vessel means seven-eighths of the vessel volume is filled with steam distillate and the remaining one-eighth is air headspace.

To accomplish the controlled heat treatment effect of the process of this invention, it is essential that the vessel air headspace be within the range of from about one-eighth to about one-half of the volume of the container or vessel. The remaining portion of the vessel is filled with steam distillate. If the vessel air headspace is greater than one-half of the container volume it is believed that excessive oxidation occurs. Consequently, the controlled heat treatment of steam distillate as described in this invention does not occur, and in fact what occurs is a noticeable deterioration in resulting flavor. On the other hand, if the vessel air headspace is less than one-eighth of the volume of the vessel the air headspace is insufficient to provide sufficient oxidation to give the desired controlled heat treatment of steam distillate as described in this invention. A preferred range of vessel air headspace is from one-quarter to three-eighths of the volume of the vessel. Within this preferred range, carefully controlled heat treatment and oxidation occur so that the beneficial steam distillate values are actually enhanced in flavor, and additionally, the deterioration effect of undesirable flavor values contained in the steam distillate is negatived.

It is essential to the process of this invention that the heat treatment be at a temperature within the range of from 80° F. to 140° F. If temperatures less than 80° F. are employed, it is believed that insufficient controlled oxidation occurs and therefore the advantages of a heat-treated steam distillate are not noticeable. On the other hand, if temperatures exceeding 140° F. are employed, controlled heat treatment does not occur but instead rapid oxidation takes place, coupled with an accompanying substantial flavor deterioration effect. The result of utilization of temperatures in excess of 140° F. is that the heat-treated distillate becomes useless as a flavor additive when added back to an instant coffee processing stream. Particularly satisfactory results have been obtained when the preferred range of temperatures of from 90° F. to 120° F. are employed. Utilization of temperatures within this preferred range has been found to enhance flavor values and minimize excess acidity and negative flavor values, as well as to be most advantageous from a processing efficiency standpoint in that excessive amounts of heat input are not required.

Heating a vessel containing steam distillate to temperatures within the hereinbefore-described ranges can be accomplished in any conventional manner of heat addition. For example, the closed vessels can be placed in a controlled temperature room, or more practically, the vessels can be placed in a controlled temperature bath maintained at the desired temperature, and, most practically, the vessel can be a jacketed vessel wherein a heat exchange fluid is circulating to provide and maintain the temperature at the desired level.

It is essential that the hereinbefore-described heat treatment occur for a time within the range of from 20 minutes to 6 hours. If the time of heat treatment is in excess of 6 hours, despite the fact that the vessel air headspace is within the desired range hereinbefore described, excessive oxidation will occur and a substantial deterioration in steam distillate flavor will result. On the other hand, if heat-treating times of less than 20 minutes are employed, insufficient heating occurs to provide the controlled heat treatment and desired oxidation effects of the process of this invention. A highly preferred time of heat treating for the process of this invention is from 1 hour to 3 hours.

The precise heat treating time within the broad and preferred ranges expressed above, employed in any particular run depends upon the heating temperature employed and the amount of surface contact between the steam distillate and air contained in the vessel. Generally, as the temperature is increased shorter heating times can be employed; likewise as the amount of surface contact between the steam distillate and air increases, shorter heating times can be employed. The amount of surface contact for any portion of the steam distillate can be increased, and therefore the heating time shortened to the lower limits of the above time ranges by continuously stirring the steam distillate during heating. Because of the shorter process times continuous stirring, for example by a magnetic stirring device, during heating is preferred.

Steam distillate obtained as hereinbefore described and heat treated according to the process of this invention is added back to the instant coffee processing stream, preferably after concentration of the aqueous extract and just before drying. Alternatively, small amounts of heat-treated steam distillate can be sprayed upon dry instant coffee to provide increased aroma. If desired, heat-treated steam distillate can be used in both manners in the same process stream.

The level of add back of steam distillate to an instant coffee processing stream, as previously mentioned, has generally been limited to within the range of from 0.1 percent to 1.0 percent by weight of roast and ground coffee employed in the extraction procedure because of the high level of acidity of the steam distillate. Heat-treated steam distillate prepared in accord with the process of this invention can be added back to an instant coffee processing stream at levels ranging from 0.01 percent to 2.0 percent by weight of roast and ground coffee employed in the extraction procedure, and preferably within the range of from 1.0 percent to 2.0 percent to provide a strong, smooth heat treated flavor. Thus, heat treated steam distillate can be added back to an instant coffee processing stream at up to double the level of nonheat-treated steam distillate without exceeding the consumer-acceptable acid tolerance level.

An instant coffee having heat-treated steam distillate, as described in the process of this invention, added back to the instant coffee processing stream provides an instant coffee having a strong, smooth, less acid, more brewlike and unique heat-treated flavor. The resulting instant coffee is especially preferred by consumers who desire a strong cup of coffee beverage.

In each of the following examples steam distillate to be treated in accord with the process of this invention is obtained from a six column pilot plant countercurrent extraction train. Each column of the extraction train is 5 feet long and has a 6 inch inside diameter. During the extraction operation the columns are connected to one another by a liquid inlet line and a liquid outlet line. Each column is loaded with 20.2 pounds of blended roast and ground coffee. The blend consists by weight of 15 percent African Robustas, 50 percent Central American Arabicas and 35 percent Brazilian and African Arabicas. Prior to connecting each of the columns into the extraction train, steam is passed downward through the columns at a temperature of 220° F. and at a pressure of 3 p.s.i.g. One pound of steam distillate is collected from each column. The total amount of steam distillate obtained is 0.30 pounds. Portions of the steam distillate are utilized in the following examples as needed and specified.

The six column extraction train is run using conventional extraction conditions. Beginning with the column containing the most nearly exhausted coffee grounds and thereafter progressing sequentially to the column containing the freshest grounds, the inlet temperature to each column is as follows: 360° F., 350° F., 325° F., 310° F., 280° F. and 230° F. The pressure employed during the extraction cycle is 150 p.s.i.g., and the extraction cycle time is 20.0 minutes.

The following examples are offered to illustrate the process of this invention.

EXAMPLE I

A 9.5 pound portion of the steam distillate obtained as described above is placed in a steel vessel having an inside volume of 0.5 ft.³. The vessel is sealed off from contact with air outside of the vessel by closing the inlet-line valves. The vessel air headspace is three-eighths of the volume of the vessel. The distillate contained in the hereinbefore described vessel is placed in a constant temperature bath wherein the temperature of the distillate is raised to, and maintained at, 120° F. for 2.5 hours.

One-thousand one-hundred and thirty pounds of an aqueous coffee extract having a solubles concentration of 22.2 percent is obtained from 594 pounds of roast and ground coffee in the manner previously described. It is thereafter concentrated to 50 percent solubles concentration by thin film evaporation. Thereafter 9.5 pounds of the hereinbefore-described heat-treated coffee distillate is added to the previously concentrated aqueous coffee extract and subsequently spray-dried in a spray dryer having a 15 cubic foot volume at an air inlet temperature of 470° F. and an air outlet temperature of 350° F. at a spray nozzle pressure of 450 p.s.i.g. 9.5 pounds of steam distillate added to the concentrated extract obtained from 594 pounds of roast and ground coffee corresponds to 1.6 percent by weight of the roast and ground coffee utilized in the extraction procedure.

The resulting spray-dried instant coffee is utilized to prepare cups of coffee beverage as follows: Two grams of the spray-dried instant coffee is placed in a cup and 180 ml. of water at a temperature of 175° F. is poured into the cup and stirred. The coffee when tasted and compared with a cup of conventional spray-dried instant coffee prepared as hereinbefore-described except that the steam distillate is not heat-treated, is noted to be stronger in flavor, smoother, less acid, more brewlike, and to have a unique heat-treated flavor.

EXAMPLE II

A 6 pound portion of the previously described steam distillate is placed in a vessel having a 0.26 ft.³ volume. This corresponds to 1.0 percent by weight of the roast and ground coffee utilized in the above described extraction procedure. (The amount of roast and ground coffee employed and the amount of extract obtained are the same as in Example I.) The vessel air headspace is one-quarter of the volume of the vessel. The vessel is closed as hereinbefore-described in Example I.

The distillate is heated at 100° F. in the manner previously described for a 3 hour period, at which time it is removed from the vessel and utilized in the manner described in Example I in regard to adding back to an instant coffee processing stream to provide an instant coffee product.

Cups of instant coffee are prepared from the dry instant coffee product in the manner previously described. In comparing cups of so-prepared beverage with cups of beverage prepared when no heat treatment of the steam distillate is employed, it is noted that when the process of this invention is utilized the resulting cups of beverage have a much stronger typical heat-treated taste, high in brewlike flavor, and less acid and more smooth.

The process as disclosed in Examples I and II is repeated utilizing heating times of 4,5, and 6 hours as well as times of 20 minutes and one hour, and a temperature of 135° F. Cups of instant coffee prepared as hereinbefore described are noted to have strong, less acid, smooth, and unique heat-treated flavors. It is noted that in comparing the individual cups of coffee as prepared, that the longer the hold or heating time is, the stronger in taste is the resulting cup of coffee beverage.

When utilizing heating times of 20 minutes and one hour continuous stirring during heating is employed.

When the process of Examples I and II is repeated utilizing temperatures of 80° F. and of 140° F., it is noted that cups of coffee beverage prepared from the resulting instant coffee are stronger, less acid, and more brewlike as well as being unique in flavor in comparison with standard instant coffee products prepared from nonheat-treated steam distillate. The hold time in each of these cases is 2 hours. Additionally, it is noted that in comparing the sample held at 80° F. with a sample held at 140° F., that the 140° F. sample is much stronger in taste than the 80° F. sample, which itself is stronger in taste than conventionally prepared instant coffee wherein steam distillate was not heat treated prior to adding back to aqueous coffee extract.

What is claimed is:

1. A process of making an instant coffee product wherein said process includes the steps of:
   a. steam distilling roast and ground coffee;
   b. collecting and condensing the steam distillate;
   c. heating said steam distillate at a temperature of from 80° F. to 140° F. for from 20 minutes to 6 hours in a closed vessel having a vessel air headspace of from one-eighth to one-half of the volume of said vessel; and thereafter
   d. adding the heat treated steam distillate back to the instant coffee processing stream.

2. The process of claim 1 wherein said steam distillate is heated for from 1 hour to 3 hours.

3. The process of claim 1 wherein said steam distillate is heated at a temperature of from 90° F. to 120° F.

4. The process of claim 1 wherein the vessel air headspace is from one-quarter to three-eighths of the volume of said vessel.

5. The process of claim 1 wherein the temperature is from 90° F. to 120° F., said steam distillate is heated for from 1 hour to 3 hours, and the vessel air headspace is from one-quarter to three-eighths of the volume of said vessel.

6. The process of claim 5 wherein continuous stirring of said steam distillate during heating is employed.

* * * * *